United States Patent [19]
Schmidt

[11] 4,079,496
[45] Mar. 21, 1978

[54] METHOD OF MAKING A THERMAL BARRIER SHAPE

[75] Inventor: Dietrich F. Schmidt, Carlisle, Pa.

[73] Assignee: Capitol Products Corporation, Mechanicsburg, Pa.

[21] Appl. No.: 664,648

[22] Filed: Mar. 8, 1976

Related U.S. Application Data

[62] Division of Ser. No. 580,975, May 27, 1975.

[51] Int. Cl.[2] .................... B23P 11/00
[52] U.S. Cl. .................... 29/432; 29/433; 29/241; 49/DIG. 1
[58] Field of Search .................... 29/450, 235, 432, 433, 29/241; 49/DIG. 1, 489; 52/731, 582, 732, 730

[56] References Cited

U.S. PATENT DOCUMENTS

| | | | |
|---|---|---|---|
| 3,156,332 | 11/1964 | Cameron | 49/DIG. 1 UX |
| 3,191,727 | 6/1965 | Schmeltz et al. | 49/DIG. 1 UX |
| 3,205,386 | 9/1965 | Henschke et al. | 29/432 UX |
| 3,385,617 | 5/1968 | Gehring et al. | 29/432 X |
| 3,411,254 | 11/1968 | Kessler | 49/1 B UX |
| 3,468,064 | 9/1969 | Fraleigh et al. | 49/DIG. 1 UX |
| 3,513,532 | 5/1970 | Lambert | 29/433 |
| 3,916,503 | 11/1975 | Chenevert et al. | 29/450 |

FOREIGN PATENT DOCUMENTS

| | | | |
|---|---|---|---|
| 2,248,474 | 10/1972 | Germany | 49/DIG. 1 |

*Primary Examiner*—Charlie T. Moon
*Attorney, Agent, or Firm*—Donald L. Johnson; John F. Sieberth; Paul H. Leonard

[57] ABSTRACT

A method of making a thermal barrier shape or lineal construction element wherein a pair of lineal metal shapes adapted to receive a lineal insulating member or shape are aligned with each other in generally parallel spaced apart relation and the lineal insulating member or shape having small lineal projections thereon is slidably inserted between the metal shapes to join them together and form the thermal barrier shape. During joining, end portions of the projections on the insulating shape are shaved off to provide a tight fit between the metal and insulating shapes.

10 Claims, 8 Drawing Figures

METHOD OF MAKING A THERMAL BARRIER SHAPE

This is a division of application Ser. No. 580,975 filed on May 27, 1975.

BACKGROUND OF THE INVENTION

The present invention is in the field of metal construction shapes and particularly those shapes used in the construction of metal windows and doors and frames therefor.

With the advent of metal construction used in curtain wall and other metal window and door enclosures, problems of heat conduction have arisen. The use of aluminum for the metal frames caused a greater transfer of heat between wall elements than had heretofore taken place in previous types of such construction. An insulation problem or the necessity for a thermal break construction element was thus essential. Various types of thermal breaks have been constructed, some of which have been satisfactory, but have been too costly. Other types have met with varying degrees of success.

Most thermal break constructions are currently formed by pouring in place an insulating material into the metal members or by mechanically joining the metal members and insulating member by deformation of the metal members. U.S. Pat. Nos. 3,204,324, 3,393,487, 3,624,885, 3,634,565 and 3,823,524 are illustrative of the former type of constructions. U.S. Pat. Nos. 3,093,217, 3,114,179, 3,420,026, and 3,411,995 are illustrative of the latter type of construction. U.S. Pat. Nos. 3,411,254, 3,289,377, 3,055,463 and 2,654,920 disclose additional prior art thermal break constructions.

Another means of mechanically joining metal members with an insulating member is disclosed in U.S. application Ser. No. 430,099, filed on Jan. 2, 1974, having a common ownership with the instant application. In this method, dimensional tolerances are essential to obtain a desired interference fit.

The present invention eliminates the necessity of expensive jigs which are required with pouring operations.

The instant invention permits some variances in dimensional tolerances providing a more economical construction.

Heat generated by metal deformation is also eliminated and metal marring and defacing is reduced.

Thermal break construction joints or lineal shapes of this invention have uniform strength and are relatively simple and easy to fabricate. The use of jig boxes and table space is also minimized.

It is a primary object of the present invention to provide a unitary thermo break connection or a thermally insulating break in metal construction shapes utilizing a rigid insulating member adapted to be mechanically received by the metal shapes which eliminates the need for exact dimensional tolerances.

SUMMARY OF THE INVENTION

The present invention relates broadly to a thermal barrier member or shape, preferably made of rigid plastic or other suitable insulating material, which has a plurality of small surface protrusions or projections thereon located at predetermined areas on the member and which is adapted to be received by metal members. Lineal metal members or metal shapes are constructed so as to receive the insulating member and provide a unitary thermal break construction joint or thermo break connections. In effect, three lineal shapes, two metal and one insulating, are mechanically longitudinally joined together to form a composite building shape. In joining the shapes together, end portions of the small projections on the insulating shape are shaved off or sheared by exposed edges of the harder metal mating shapes. A tight connection or interference fit is thus achieved.

The insulating or thermal barrier member is preferably an extruded or molded rigid plastic and may be made from any suitable material such as PVC, nylon, urethane, styrene, polyethylene, hard rubber and the like. The metal shapes are preferably aluminum and may be extruded, cast, wrought or otherwise formed. The term aluminum includes aluminum and aluminum alloys customarily used in the construction industry, especially in the manufacture of windows, doors, curtain walls and frames therefor. Aluminum extrusions are preferred.

Although some degree of dimensional tolerances are essential, the unique construction of this invention permits the metal shapes to conform to irregularities and dimensional variations.

DESCRIPTION OF THE PREFERRED EMBODIMENT

Figure 1:
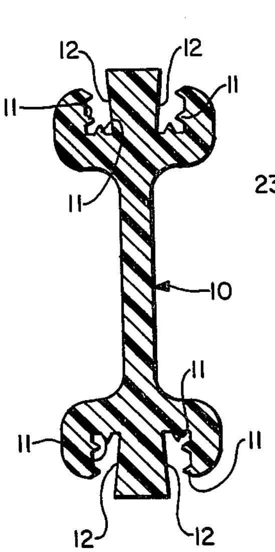
FIG. 1 is a view in cross-section illustrating one type of a thermal barrier member of the invention.
Figure 2:
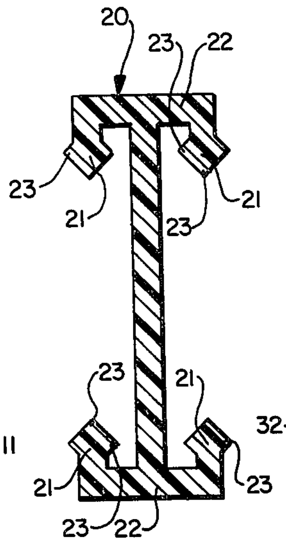
FIG. 2 is a view in cross-section illustrating another type of a thermal barrier member.
Figure 3:
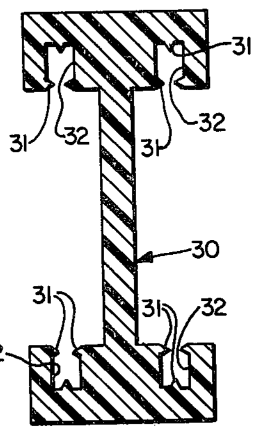
FIG. 3 is a view in cross-section illustrating still another type of thermal barrier member.
Figure 4:
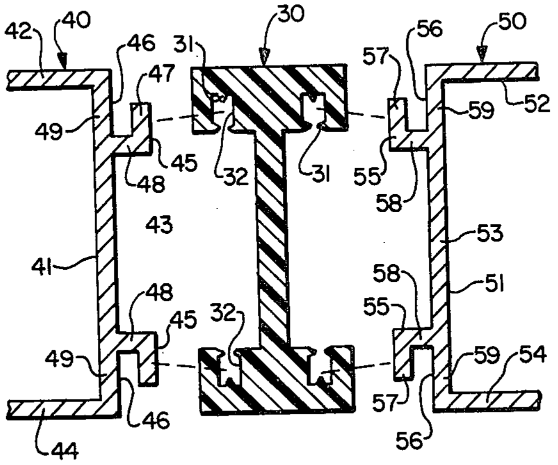
FIG. 4 is a view in cross-section illustrating the FIG. 3 embodiment and corresponding metal members to which it is to be joined thereto.

Referring now to the drawings, FIGS. 1, 2 and 3 illustrate in cross-section various lineal plastic shapes designated 10, 20 and 30, respectively, which are suitable for use in the present invention. For simplicity of construction, the upper and lower portions of the plastic shapes are substantially identical. Each of the shapes has a plurality of relatively small projections or surface protrusions 11, 21 and 31, respectively, thereon which extend longitudinally the length of the shape. The projections are so located on the plastic shapes and so constructed thereon as to make a shearing contact with their respective mating metal members as will be more fully explained hereinafter.

It can be appreciated that the insulating members may be of various configurations. The small projections may be located in female type openings, such as shown in the members 10 and 30 or may be located on male type members, such as seen in the shape 20.

In the FIGS. 1 and 3 embodiments, openings or channels 12 and 32 are formed in the members 10 and 30, respectively, for receiving mating projections on metal members. The small projections 11 and 31 extend into their respective openings a desired or predetermined amount. Additional projections may be added as required or desired. The openings or channels 12 and 32 are of a generally or somewhat rectangular construction when viewed in cross-section and extend the length of the shape therein.

In the FIG. 2 embodiment, the member 20 is somewhat "T"-shaped on each end thereof and has a pair of somewhat diamond shaped or male members 21 extending inwardly from each cross-bar 22. The cross-bars and male members thereon extend longitudinally the length of the shape 20. The male members 21 are so constructed that end portions or small projections 23 are formed thereon. The projections 23 are adapted so as to make a shearing contact with metal members adapted to receive the male members 21.

A shape, either plastic or metal, is defined as a product that is long in relation to its cross-sectional dimensions and has a cross-section other than that of sheet, plate, rod, bar, tube or wire.

The size and weight of the plastic members and their corresponding metal members is largely determined by strength and use specifications. In general, sizing of the thermal barrier is a function of obtaining the overall strength, i.e., the minimum thickness required for a given application and the desired interference fit between the plastic and metal members.

Of the plastics suitable for constructing the thermal barrier shape, PVC (polyvinylchloride) is preferred. The plastic shape may be formed by extrusion, molding or other processes, with the former being preferred.

Referring now to FIGS. 4—7, the relationship of the member 30 to joining metal members 40 and 50 is illustrated. The metal members 40 and 50 are constructed so as to be mateable with the member 30. The portions of the metal members 40 and 50 which are joined to the member 30 are substantially identical. It can be appreciated that the parts (not shown) of the metal members which extend away from the mating area or part can be of various configurations depending upon the end use of the thermal break joint or connection.

The member 40 has a channel or "U"-shaped end 41 formed by members 42, 43 and 44. The member 43 has a pair of "L"-shaped or right angled shaped projections 45 extending perpendicularly from one side thereof. The projections 44 extend longitudinally the length of the shape 40. Channels or openings 46 are formed by the end portion or male members 47 of the members 45, perpendicular members 48 of the member 45 and end segments 49 of the member 43.

Figure 5:
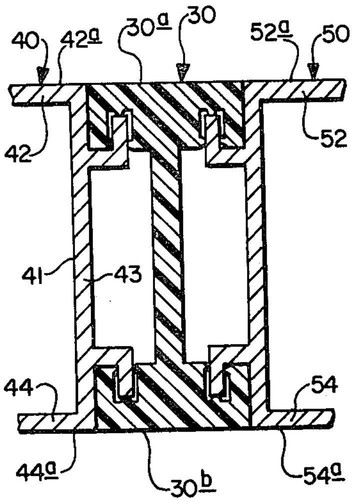
FIG. 5 is a view similar to that of FIG. 4 illustrating the thermal barrier member of FIG. 3 after it has been joined to the metal members to form a unitary thermo break or insulating joint or construction.
Figure 6:
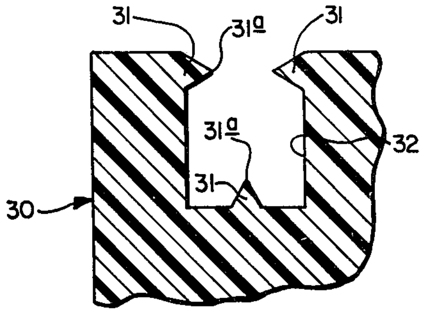
FIG. 6 is a view in cross-section of a portion of the FIG. 3 embodiment illustrating the details of the small surface protrusions or projections on the thermal barrier member.
Figure 7:
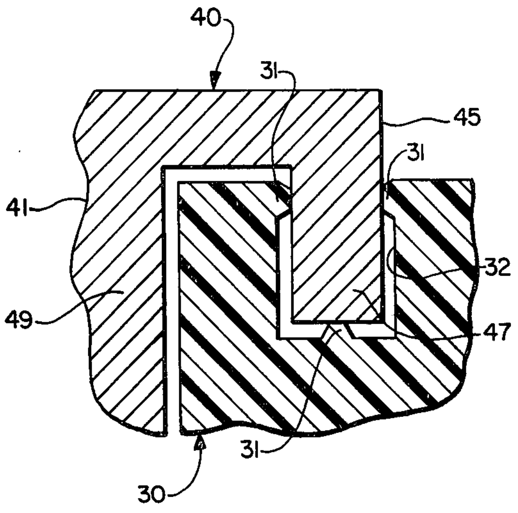
FIG. 7 is a view in cross-section of a portion of the FIG. 4 embodiment illustrating the details of the projections after the insulating and metal members have been joined together; and, FIG. 8 is a perspective view illustrating one means of joining together the thermal barrier or insulating member and metal members of FIGS. 4 and 5.

The members 47 are sufficiently narrow that they can be received by the openings 32 in the member 30 but are also sufficiently wide that during the insertion of the members 47 into the openings 32, end portions of the small projections 31 are shaved off or sheared (FIGS. 5 and 7).

The metal member 50 is similarly constructed as the member 40 and has a channel member 51 formed by members 52, 53 and 54. The member 53 has a pair of right angled shaped projections 55 extending perpendicularly from one side thereof. The projections 54 extend longitudinally the length of the shape 50. Channels or openings 56 are formed by male members 57 of the members 55, perpendicular members 58 of the members 55, and end segments 59 of the member 53.

As in the case of the members 47, the members 57 are of a sufficiently narrow width that they can be received by the openings 32 in the member 30, but are also of a sufficient width that during the insertion of the members 57 into the openings 32, end portions of the small protrusions 31 are sheared or shaved off.

After the metal members 40 and 50 have been joined together by the plastic or insulating member 30, as will be explained more fully hereinafter, a unitary thermo break or thermal barrier joint or connection is formed. When the plastic and metal members have been formed, the projections 47 are tightly fit in the openings 32 and the external or outer edges or surfaces 30*a* of the member 30 are in alignment with the outer edges 42*a* of member 42 and 52*a* of member 52 and the outer surfaces 30*b* of the member 30 are in alignment with the outer edges 44*a* of member 44 and 54*a* of member 54.

Figure 8:
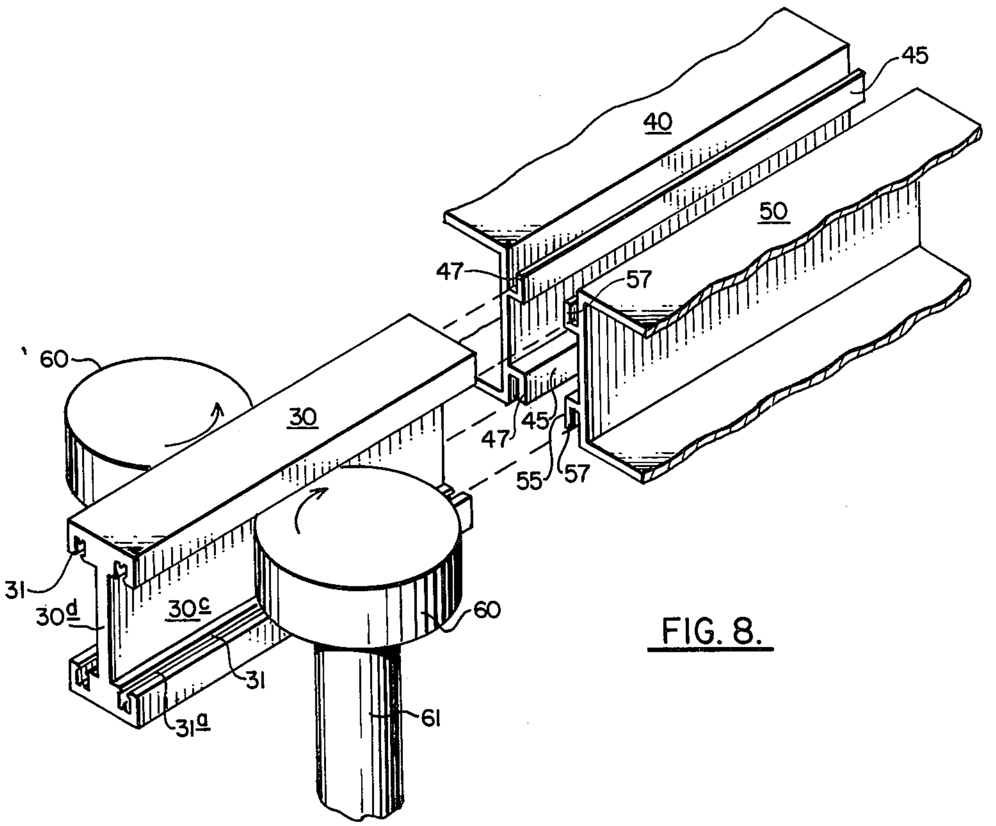

In joining the metal members 40 and 50 to the plastic member 30, the metal members are aligned parallel to each other in a spaced apart relationship as shown in FIG. 8 with angle shaped projections 47 and 57 facing each other. The metal members may be held in place by jigs or other suitable apparatus or even manually, if desired.

The plastic member 30 is placed in a position before the opening between the metal members and is moved longitudinally between the metal members. Preferably, the member or shape 30 is force fed into the opening between the metal members by suitably located spaced apart rollers 60. The drive shafts 61 of the rollers are parallel to the large flat surfaces 30*a* and 30*d* of the shape 30. This arrangement permits the application of high pressure on the plastic when feeding the shape into adjoinment with the metal members without crushing or damaging the plastic material.

As the member 30 is introduced into the space between the metal members 40 and 50, the edges of the metal male members 47 and 57 are met or contacted by end portions 31*a* of the projections 31 of the member 30. As force is applied to the shape 30 to move it longitudinally and slidably between the members 40 and 50, the harder metal edges cause the end portions 31*a* to be sheared or shaped off, as the male members 47 and 57 receive their respective openings 32. As seen in FIG. 7, this results in a tight or interference fit between the plastic and metal members and a unitary thermal break construction shape is formed.

As can readily be seen, this unique construction avoids the necessity for costly highly exact tolerances in the manufacture or extrusion of plastic and metal shapes. Minor irregularities in dimensions present no problems, as all or part of the small protrusions 31 may be sheared or removed in the joining process and a tight fit can still be obtained.

It can be appreciated that various mating arrangements of plastic and metal members can be constructed. It is only essential that the plastic members have small protrusions or projections thereon, which are adapted to be all or partially removed when mated or joined with their corresponding metal members, and which are so located or positioned on the plastic member and in sufficient numbers to provide a desired interference fit.

It is of course also essential that the mating portion of the metal members be of a size and configuration so as to properly receive the mating portions of the insulating member and to effect the necessary shearing action to remove at least an end portion of the small projections or protrusions on the insulating member to thereby obtain the desired interference fit.

The metal members may have male joining members extending therefrom adapted to be mated with openings or female parts of the insulating member or the metal members may have members extending therefrom which have openings or female parts therein for mating with male members extending from or on the insulating member.

The foregoing disclosure and description of the invention is only illustrative and explanatory thereof and various changes in the size, shape and materials, as well as in the details of the illustrated contruction, may be made within the scope of the appended claims without departing from the spirit of the invention.

What is claimed is:

1. A method of forming a thermal barrier lineal metal construction shape comprising the steps of:

(a) aligning a pair of lineal metal shapes adjacent each other in generally parallel spaced apart relation, each of said metal shapes having at least one member extending therefrom and into the space between the aligned metal shapes, and said extending members being of a predetermined size adapted to receive a lineal insulating shape;

(b) aligning before said metal shapes and the space therebetween a lineal insulating shape adapted to be received by said extending members on said metal shapes, said insulating shape having a plurality of small projections thereon adapted to be engaged by edges of said metal shapes facing said insulating shape, said projections being of a predetermined size and so related to the size of said extending members than when said insulating shape is inserted in said channels end portions of said projections are sheared therefrom and, (c) inserting said insulating shape into the space between said metal shapes and into a mating relationship with said extending members whereby as said insulating shape is moved between said metal shapes, said small projections engage edges of said metal shapes and end portions of said projections are sheared or, thereby providing an interference fit between said lineal metal shapes and said lineal insulating shape, thereby forming a unitary lineal thermal barrier construction shape.

2. The method of claim 1, wherein said members extending from said metal shapes have male members thereon and said insulating shape has openings or female parts thereon for receiving said male members on said metal shapes and said small projections on said insulating shape extend into said openings on said insulating shape a predetermined amount.

3. The method of claim 1, wherein said members extending from said metal shapes have female parts or openings thereon and said insulating shape has male members thereon for insertion in said openings on said extending metal members and said small projections are located on said male members of said insulating shape and extend therefrom a predetermined amount.

4. The method of claim 1, wherein said members extending from said metal shapes are angled shaped in cross-section and said small projections on said insulating shape are located in openings in said insulating shape adapted to receive at least a portion of said angled shaped members.

5. The method of claim 1, wherein said small projections on said insulating shape are of a somewhat triangular configuration in cross-section.

6. The method of claim 1, wherein said metal shapes are aluminum extrusions.

7. The method of claim 1, wherein said insulating shape is an extruded plastic shape.

8. The method of claim 1, wherein the lineal metal shapes are held in generally parallel spaced apart relation by jigs or other suitable apparatus.

9. The method of claim 8, wherein the insulating shape is positioned before the space between the metal shapes and is force fed into said space between the metal members by driven rollers.

10. The method of claim 1, wherein said metal shapes are held in place and said insulating shape is slidably inserted or moved longitudinally into the space between the metal shapes.

* * * * *

UNITED STATES PATENT AND TRADEMARK OFFICE

CERTIFICATE OF CORRECTION

PATENT NO. : 4,079,496

DATED : March 21, 1978

INVENTOR(S) : Dietrich F. Schmidt

It is certified that error appears in the above–identified patent and that said Letters Patent are hereby corrected as shown below:

Column 1, line 32, "3,055,463" should read -- 3,055,468 --.

Signed and Sealed this

*Third* Day of *March 1981*

[SEAL]

*Attest:*

RENE D. TEGTMEYER

*Attesting Officer* *Acting Commissioner of Patents and Trademarks*